(12) United States Patent
Nagayasu

(10) Patent No.: US 11,524,527 B2
(45) Date of Patent: Dec. 13, 2022

(54) PNEUMATIC TIRE

(71) Applicant: The Yokohama Rubber Co., LTD., Tokyo (JP)

(72) Inventor: Masaaki Nagayasu, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 323 days.

(21) Appl. No.: 16/755,525

(22) PCT Filed: Aug. 23, 2018

(86) PCT No.: PCT/JP2018/031067
§ 371 (c)(1),
(2) Date: Apr. 10, 2020

(87) PCT Pub. No.: WO2019/073699
PCT Pub. Date: Apr. 18, 2019

(65) Prior Publication Data
US 2021/0206207 A1  Jul. 8, 2021

(30) Foreign Application Priority Data

Oct. 12, 2017  (JP) .............................. JP2017-198570

(51) Int. Cl.
*B60C 11/04* (2006.01)
*B60C 11/12* (2006.01)
*B60C 11/03* (2006.01)

(52) U.S. Cl.
CPC .......... *B60C 11/1236* (2013.01); *B60C 11/04* (2013.01); *B60C 11/1204* (2013.01); *B60C 11/1272* (2013.01); *B60C 2011/036* (2013.01); *B60C 2011/0365* (2013.01); *B60C 2011/0372* (2013.01); *B60C 2011/1213* (2013.01)

(58) Field of Classification Search
CPC . B60C 11/1236; B60C 11/04; B60C 11/1204; B60C 11/1272; B60C 2011/036;
(Continued)

(56) References Cited

U.S. PATENT DOCUMENTS 10,730,351 B2 * 8/2020 Fujii .................... B60C 11/0306
11,203,234 B2 * 12/2021 Suzuki ................... B60C 11/13
(Continued)

FOREIGN PATENT DOCUMENTS

JP  2009-101846  5/2009
JP  2009-173241  8/2009
(Continued)

OTHER PUBLICATIONS

International Search Report for International Application No. PCT/JP2018/031067 dated Nov. 20, 2018, 5 pages, Japan.

*Primary Examiner* — Matthew J Daniels
*Assistant Examiner* — Shibin Liang
(74) *Attorney, Agent, or Firm* — Thorpe North & Western

(57) ABSTRACT

A tire includes a tread, sidewalls, beads, and pairs of first and second grooves formed in the tread. A first land is between the first grooves, and second lands are between one of the first and second grooves and between another of the first and second main grooves. First sipes and lateral grooves are in the first land, at the same angle, the first sipes being connected to the lateral grooves. The first sipe and the lateral groove open to one of the first grooves. Second sipes and auxiliary grooves are in a bent shape in the second land. The first and second sipes are oriented the same. The auxiliary groove includes first and second portions. An intersection angle of the first portion with the second sipe is within 45° to 90°. A length a of the first portion and a length b of the second portion satisfy $0.05 \times a \leq b \leq 0.4 \times a$.

2 Claims, 3 Drawing Sheets

(58) Field of Classification Search
CPC ..... B60C 2011/0365; B60C 2011/0372; B60C 2011/1213; B60C 11/13; B60C 11/03
See application file for complete search history.

(56) References Cited

U.S. PATENT DOCUMENTS

| | | |
|---|---|---|
| 2009/0101260 A1 | 4/2009 | Ikegami |
| 2009/0188596 A1 | 7/2009 | Kojima |
| 2009/0255614 A1 | 10/2009 | Ebiko |
| 2016/0082780 A1 | 3/2016 | Nagahara et al. |
| 2017/0190222 A1 | 7/2017 | Suzuki |
| 2017/0355231 A1 | 12/2017 | Marlier et al. |
| 2018/0065417 A1 | 3/2018 | Hoshiba |
| 2018/0354312 A1 | 12/2018 | Scheifele |

FOREIGN PATENT DOCUMENTS

| | | | | |
|---|---|---|---|---|
| JP | 2009-214761 | 9/2009 | | |
| JP | 2009-248961 | 10/2009 | | |
| JP | 2010-047134 | 3/2010 | | |
| JP | 2012-171479 | 9/2012 | | |
| JP | 5181927 | 4/2013 | | |
| JP | 2014-205410 | 10/2014 | | |
| JP | 2016-064726 | 4/2016 | | |
| JP | 2016-165981 | 9/2016 | | |
| JP | 2017-196978 | 11/2017 | | |
| JP | 2018-144653 | 9/2018 | | |
| WO | 2016024593 | * | 2/2016 | ............ B60C 11/03 |
| WO | WO 2016/024593 | 2/2016 | | |
| WO | WO 2016/102350 | 6/2016 | | |
| WO | WO 2016/143642 | 9/2016 | | |
| WO | WO 2017/112504 | 6/2017 | | |
| WO | WO 2017/187734 | 11/2017 | | |

* cited by examiner

PNEUMATIC TIRE

TECHNICAL FIELD

The present technology relates to a pneumatic tire suitable as an all-season tire, and in particular, the present technology pertains to a pneumatic tire that can enhance snow performance while appropriately maintaining steering stability on dry road surfaces.

BACKGROUND ART

An all-season tire is required to exhibit excellent snow performance at the time of snowfall. Accordingly, a conventional all-season tire is designed to include a plurality of main grooves disposed in a tread portion to extend in a tire circumferential direction, and a plurality of sipes or lug grooves extending in a tire lateral direction are disposed in land portions defined by the main grooves. Thus, snow traction is ensured by the sipes or the lug grooves (for example, see Japan Unexamined Patent Publication Nos. 2009-173241 and 2009-214761).

In addition, a tire structured such that a plurality of sub grooves each having a bent shape are formed in land portions of a tread portion has been proposed, and groove components are increased by the sub grooves and thus steering stability on wet road surfaces is improved and good snow performance is secured (for example, see Japanese Patent No. 5181927).

However, when an all-season tire is structured such that the groove area is increased in order to improve snow performance, steering stability on dry road surfaces may decrease, and in the aforementioned various tread structures, it is difficult to achieve both steering stability on dry road surfaces and snow performance.

SUMMARY

The present technology provides a pneumatic tire that can enhance snow performance while appropriately maintaining steering stability on dry road surfaces.

A pneumatic tire according to an embodiment of the present technology includes: a tread portion extending in a tire circumferential direction and having an annular shape; a pair of sidewall portions disposed on both sides of the tread portion; and a pair of bead portions disposed inward of the sidewall portions in a tire radial direction. At least four circumferential grooves including a pair of first main grooves located on both sides of a tire equator and extending in the tire circumferential direction, and a pair of second main grooves located outward of the first main grooves and extending in the tire circumferential direction are formed in the tread portion. A first land portion is defined between the pair of first main grooves. Second land portions are respectively defined between one of the first main grooves and one of the second main grooves and between the other of the first main grooves and the other of the second main grooves. A plurality of first sipes each having a groove width equal to or smaller than 1 mm and extending in a tire lateral direction, and a plurality of lateral grooves each having a width greater than 1 mm and extending in the tire lateral direction are formed in the first land portion. The first sipe and the lateral groove are disposed at the same angle with respect to the tire circumferential direction and are connected to each other, and the first sipe and the lateral groove are respectively opened to one of the pair of first main grooves. A plurality of second sipes each extending in the tire lateral direction, and a plurality of auxiliary grooves each having one end opened to the second main groove and the other end closed in the second land portion and each being formed in a bent shape are formed in the second land portion. The second sipe is oriented in the same direction as the first sipe. The auxiliary groove includes a first groove portion extending from an open end to a bend point and a second groove portion extending from the bend point to a closed end. An intersection angle of the first groove portion with respect to the second sipe is in a range of 45° to 90°. A length a of the first groove portion and a length b of the second groove portion satisfy a relationship of $0.05 \times a \le b \le 0.4 \times a$.

In the present technology, the plurality of first sipes and the plurality of lateral grooves are formed in the first land portion. The first sipes and the lateral grooves are disposed at the same angle with respect to the tire circumferential direction and are connected with each other. Each of the first sipes is opened to one of the pair of first main grooves and each of the lateral grooves is opened to one of the pair of first main grooves, and thus snow discharge properties can be improved while the rigidity of the first land portion is ensured. Additionally, the orientation of the first sipes disposed in the first land portion coincides with the orientation of the second sipes disposed in the second land portion, and thus the first sipes and the second sipes are likely to open at the time of traveling on snow. Consequently, the snow discharge properties can be improved. Moreover, the auxiliary grooves each having the other end closed and formed in a bent shape are formed in the second land portion, and the intersection angle of the first groove portion of the auxiliary groove with respect to the second sipe is within the predetermined range. In addition, since the length a of the first groove portion of the auxiliary groove and the length b of the second groove portion of the auxiliary groove satisfy the predetermined relationship, snow traction can be enhanced while the rigidity of the second land portion can be secured. As a result, the snow performance can be improved while the steering stability on dry road surfaces can be appropriately maintained.

In the present technology, when an imaginary extended portion is assumed to be formed by extending the lateral groove toward the first main groove to which the lateral groove is opened, the second groove portion of the auxiliary groove may be disposed not overlapping with the imaginary extended portion of the lateral groove. The second groove portion of the auxiliary groove is positioned not coinciding with the imaginary extended portion of the lateral groove, and thus the rigidity of the tread portion can be avoided from locally decreasing on the tire circumference. Consequently, the snow performance can be improved while the steering stability on dry road surfaces can be appropriately maintained.

Further, a third land portion may be defined outward of a circumferential groove of the circumferential grooves, the circumferential groove is located on the outermost side in the tire lateral direction. A plurality of lug grooves extending in the tire lateral direction and not being in communication with the circumferential groove, and a plurality of longitudinal grooves connecting the lug grooves, located side by side in the tire circumferential direction, to each other may be formed in the third land portion. When the plurality of lug grooves and the plurality of longitudinal grooves are formed in the third land portion, the snow performance can be improved based on the lug grooves and the longitudinal grooves. In addition, the lug grooves disposed in the third land portion are not communicated with the circumferential groove, and thus the rigidity of the third land portion can be ensured, and the steering stability on dry road surfaces can be improved.

Additionally, an angle $\theta_A$ with respect to the tire circumferential direction of the lateral groove disposed in the first land portion, an angle $\theta_B$ with respect to the tire circumferential direction of the first groove portion of the auxiliary groove disposed in the second land portion, and an angle $\theta_C$ with respect to the tire circumferential direction of the lug groove disposed in the third land portion may satisfy a relationship of $(\theta_A+\theta_B)/2-15°\leq\theta_C\leq(\theta_A+\theta_B)/2+15°$. The angle $\theta_A$ of the lateral groove, the angle $\theta_B$ of the first groove portion of the auxiliary groove, and the angle $\theta_C$ of the lug groove are optimized as just described, and thus the rigidity of the tread portion can be prevented from decreasing. In addition, the snow performance can be improved while the steering stability on dry road surfaces can be appropriately maintained.

The angle $\theta_C$ with respect to the tire circumferential direction of the lug groove disposed in the third land portion is an angle in a ground contact region of the tread portion. The ground contact region is a region specified by a ground contact width in the axial direction of the tire, which is measured when a regular load is applied to the tire in a state the tire mounted on a regular rim is inflated to a regular internal pressure while being placed vertically on a flat surface. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (European Tire and Rim Technical Organization). In the system of standards, including standards with which tires are complied, "regular internal pressure" is air pressure defined by each of the standards for each tire, and is referred to as "maximum air pressure" in the case of JATMA, the maximum value in Table of "TIRE ROAD LIMITS AT VARIOUS COLD INFLATION PRESSURES" in the case of TRA, and "INFLATION PRESSURE" in the case of ETRTO. However, "regular internal pressure" is 180 kPa in a case where a tire is a tire for a passenger vehicle. In the system of standards, including standards with which tires are complied, "regular load" is a load defined by each of the standards for each tire, and is referred to as "maximum load capacity" in the case of JATMA, the maximum value described Table of "TIRE ROAD LIMITS AT VARIOUS COLD INFLATION PRESSURES" in the case of TRA, and "LOAD CAPACITY" in the case of ETRTO. However, "regular load" is a load corresponding to 88% of the loads described above in a case where a tire is a tire for a passenger.

DETAILED DESCRIPTION

Figure 1:
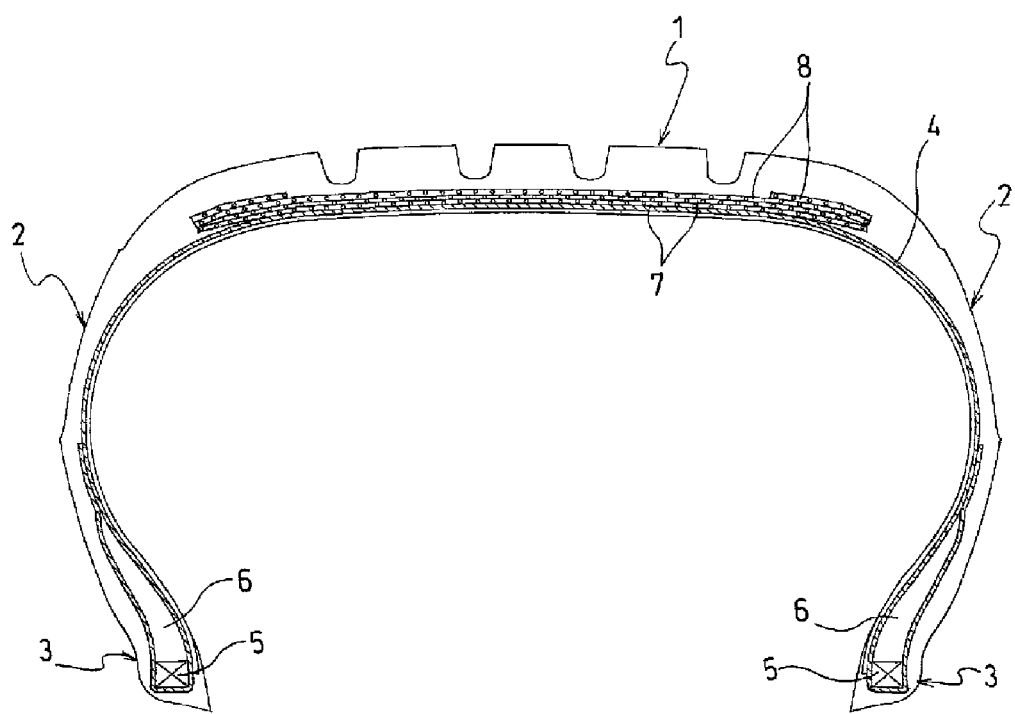
FIG. 1 is a meridian cross-sectional view illustrating a pneumatic tire according to an embodiment of the present technology.
Figure 2:
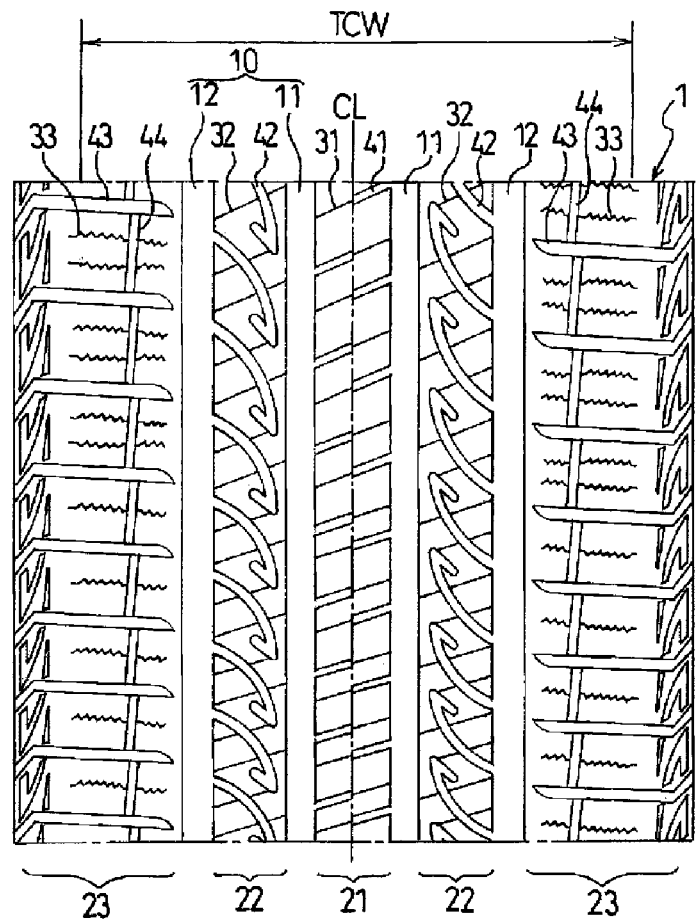
FIG. 2 is a developed view illustrating a tread pattern of the pneumatic tire according to the embodiment of the present technology.
Figure 3:
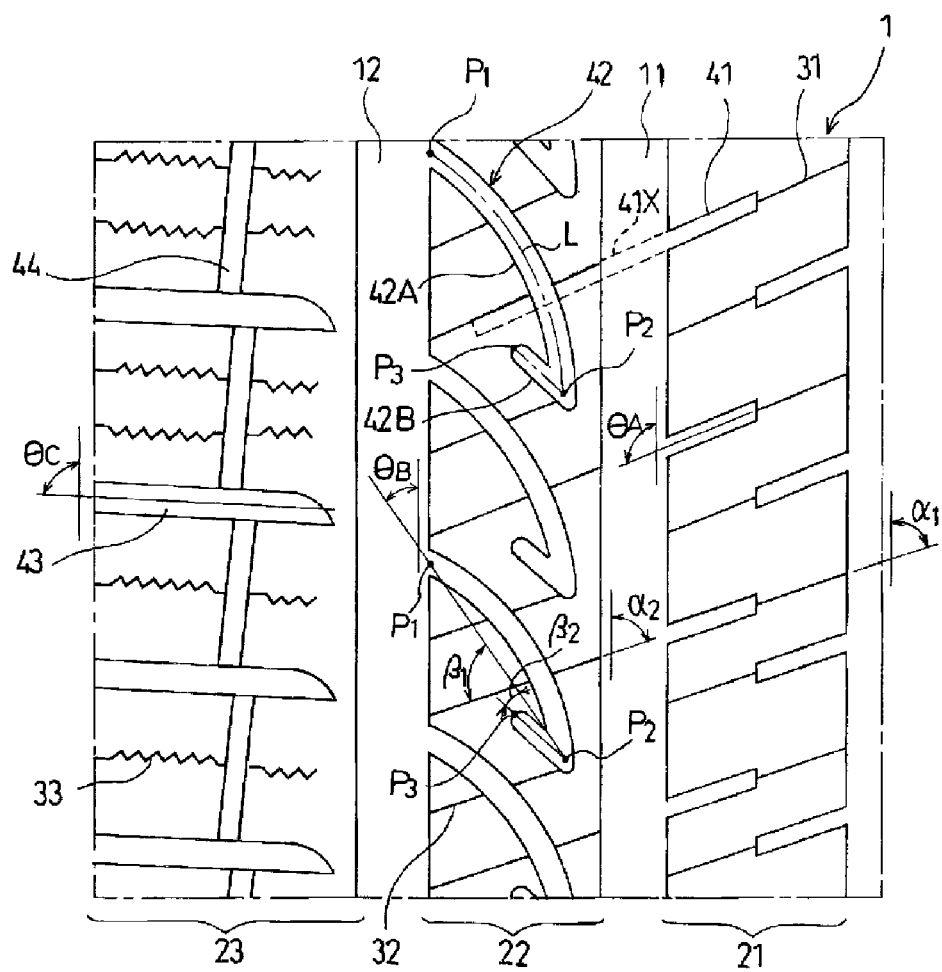
FIG. 3 is a plan view illustrating a first land portion, second land portions, and third land portions in the tread pattern of FIG. 2. Note that the third land portion is a portion within a ground contact region.

Configurations of embodiments of the present technology will be described in detail below with reference to the accompanying drawings. FIGS. 1 to 3 illustrate a pneumatic tire according to an embodiment of the present technology. As illustrated in FIG. 1, a pneumatic tire of the present embodiment includes an annular tread portion 1 extending in the tire circumferential direction, a pair of sidewall portions 2 and 2 disposed on both sides of the tread portion 1, and a pair of bead portions 3 and 3 disposed inward of the sidewall portions 2 in the tire radial direction.

A carcass layer 4 is mounted between the pair of bead portions 3 and 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, with the reinforcing cords of the different layers arranged in a criss-cross manner. In the belt layers 7, the inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8, formed by arranging reinforcing cords at an angle of, for example, not greater than 5° with respect to the tire circumferential direction, is disposed on an outer circumferential of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

In FIG. 2, the tire equator is indicated by CL, and the ground contact width is indicated by TCW. A region within the ground contact width TCW is a ground contact region. As illustrated in FIG. 2, at least four main grooves 10 extending in the tire circumferential direction are formed in the tread portion 1. The circumferential grooves 10 include a pair of first main grooves 11 located at both sides of the tire equator CL and extending in the tire circumferential direction, and a pair of second main grooves 12 located outward of the first main grooves 11 in the tire lateral direction and extending in the tire circumferential direction. The dimensions of the first main groove 11 and the second main groove 12 are not particularly limited; however, for example, the groove width is set in a range of 5.0 mm to 15.0 mm and the groove depth is set in a range of 6.0 mm to 10.0 mm.

Thus, a first land portion 21 extending in the tire circumferential direction is defined between the first main grooves 11 and 11. Second land portions 22 extending in the tire circumferential direction are respectively defined between one of the first main grooves 11 and one of the second main grooves 12 and between the other of the first main grooves 11 and the other of the second main grooves 12. Third land portions 23 are defined outward of the respective second main grooves 12 (grooves of the circumferential grooves 10, which are located at the outermost in the tire lateral direction) in the tire lateral direction.

A plurality of first sipes 31 extending in the tire lateral direction and a plurality of lateral grooves 41 extending in the tire lateral direction are formed in the first land portion 21 located on the tire equator CL. Each of the first sipes 31 has a groove width of 1 mm or smaller, and meanwhile each of the lateral grooves 41 has a groove width of 1 mm or larger and more preferably of 1.0 mm or larger to 3.0 mm. The first sipe 31 and the lateral groove 41 are disposed at the same angle with respect to the tire circumferential direction and are connected to each other, and the first sipe 31 and the lateral groove 41 are respectively opened to one of the pair of first main grooves 11 and 11. More preferably, the plurality of first sipes 31 are disposed so that the first sipe 31 communicated with the first main groove 11 located at one side and the first sipe 31 communicated with the first main groove 11 located at the other side are alternately positioned in the tire circumferential direction. The plurality of lateral grooves 41 are disposed so that the lateral groove 41 communicated with the first main groove 11 located at the other side and the lateral groove 41 communicated with the first main groove 11 located at one side are alternately positioned in the tire circumferential direction.

A plurality of second sipes 32 extending in the tire lateral direction and a plurality of auxiliary grooves 42 each having one end opened to the second main groove 12 and the other end closed in the second land portion 22 and each formed in a bent shape are formed in each of the second land portions 22 located outward of the respective first main grooves 11. The second sipe 32 of the second land portion 22 has a groove width of 1 mm or smaller. The second sipe 32 is oriented in the same direction as the first sipe 31 of the first land portion 21. More specifically, as illustrated in FIG. 3, when an angle of the first sipe 31 with respect to the tire circumferential direction is indicated by $\alpha_1$ and an angle of the second sipe 32 with respect to the tire circumferential direction is indicated by $\alpha_2$, the difference between the angles ($|\alpha_2-\alpha_1|$) is 10° or smaller.

The auxiliary groove 42 is formed in a bent shape of a fishhook and is bent at a bend point $P_2$ on the centerline L thereof. The auxiliary groove 42 includes a first groove portion 42A extending from an open end $P_1$ to the bend point $P_2$, and a second groove portion 42B extending from the bend point $P_2$ to a closed end $P_3$. An intersection angle $\beta_1$ of the first groove portion 42A with respect to the second sipe 32 is set in a range of 45° to 90°. The intersection angle $\beta_1$ is an angle formed by a straight line, connecting the open end $P_1$ and the bend point $P_2$ of the auxiliary groove 42, with respect to the second sipe 32. Additionally, a bend angle $\beta_2$ of the second groove portion 42B with respect to the first groove portion 42A is set in a range of 0° to 45°. The bend angle $\beta_2$ is an angle formed by a straight line, connecting the bend point $P_2$ and the closed end $P_3$ of the auxiliary groove 42, with respect to the straight line connecting the open end $P_1$ and the bend point $P_2$. Furthermore, a length a of the first groove portion 42A and a length b of the second groove portion 42B satisfy a relationship of 0.05×a≤b≤0.4×a. The length a of the first groove portion 42A is a length from the open end $P_1$ to the bend point $P_2$, which is measured along the centerline L of the auxiliary groove 42, and the length b of the second groove portion 42B is a length from the bend point $P_2$ to the closed end $P_3$, which is measured along the centerline L of the auxiliary groove 42.

A plurality of lug grooves 43 extending in the tire lateral direction and a plurality of longitudinal grooves 44 each connecting the lug grooves 43 located side by side in the tire circumferential direction are formed in the third land portion 23 located in a shoulder region of the tread portion 1. Each of the lug grooves 43 is not in communication with the second main groove 12. Additionally, a plurality of third sipes 33 extending in the tire lateral direction are formed in the third land portion 23. The third sipes 33 are not in communication with the second main groove 12. The shape of the third sipe 33 is not particularly limited; however, a zigzag shape is adopted herein from the perspective of securing rigidity.

The aforementioned pneumatic tire is structured such that a plurality of first sipes 31 and a plurality of lateral grooves 41 are formed in the first land portion 21, that each of the first sipes 31 and each of the lateral grooves 41 are disposed at the same angle with respect to the tire circumferential direction and are connected to each other, and that the first sipe 31 and the lateral groove 41 are respectively opened to one of the pair of first main grooves 11 and 11. Thus, the rigidity of the first land portion 21 can be ensured compared with a case where the first land portion 21 is divided only by thick grooves extending in the tire lateral direction. In addition, snow discharge properties can be improved compared with a case where the first land portion 21 is divided only by narrow sipes extending in the tire lateral direction.

Further, the orientation of the first sipes 31 disposed in the first land portion 21 coincides with the orientation of the second sipes 32 disposed in the second land portion 22, and thus the first sipes 31 and the second sipes 32 are likely to open at the time of traveling on snow. Consequently, the snow discharge properties can be improved. Furthermore, the auxiliary grooves 42 each having the other end closed and each formed in a bent shape are formed in the second land portion 22, and the intersection angle $\beta_1$ of the first groove portion 42A of the auxiliary groove 42 with respect to the second sipe 32 is within the predetermined range. In addition, since the length a of the first groove portion 42A of the auxiliary groove 42 and the length b of the second groove portion 42B of the auxiliary groove 42 satisfy the predetermined relationship, snow traction can be enhanced while the rigidity of the second land portion 22 can be secured. As a result, the snow performance can be improved while the steering stability on dry road surfaces can be appropriately maintained.

Here, when the intersection angle $\beta_1$ of the first groove portion 42A of the auxiliary groove 42 with respect to the second sipe 32 is smaller than 45°, the rigidity of the second land portion 22 decreases, and thus the steering stability on dry road surfaces deteriorates. In particular, the intersection angle $\beta_1$ is preferably in a range of 45° to 90°. Additionally, when the length b of the second groove portion 42B of the auxiliary groove 42 is smaller than 0.05 times the length a of the first groove portion 42A, the improvement effect of snow performance is insufficient. In contrast, when the length b of the second groove portion 42B of the auxiliary groove 42 is larger than 0.4 times the length a of the first groove portion 42A, the steering stability on dry road surfaces deteriorates. In particular, the length a of the first groove portion 42A and the length b of the second groove portion 42B preferably satisfy a relationship of 0.1×a≤b≤0.3×a.

In the aforementioned pneumatic tire, as illustrated in FIG. 3, when an imaginary extended portion 41X is assumed to be formed by extending the lateral groove 41 toward the first main groove 11 to which the lateral groove 41 is opened, the second groove portion 42B of the auxiliary groove 42 is disposed not overlapping with the imaginary extended portion 41X of the lateral groove 41. The second groove portion 42B of the auxiliary groove 42 is positioned not coinciding with the imaginary extended portion 41X of the lateral groove 41, and thus the rigidity of the tread portion 1 can be avoided from locally decreasing on the tire circumference. Consequently, the snow performance can be improved while the steering stability on dry road surfaces can be appropriately maintained.

Further, in the aforementioned pneumatic tire, a plurality of lug grooves 43 extending in the tire lateral direction and not being in communication with the second main groove 12 and a plurality of longitudinal grooves 44 each connecting the lug grooves 43 and 43 located side by side in the tire circumferential direction are formed in the third land portion 23 located outward of the second main groove 12 (the groove of the circumferential grooves 10, which is located at the outermost side in the tire lateral direction). The snow performance can be improved based on the lug grooves 43 and the longitudinal grooves 44. In addition, since the lug grooves 43 disposed in the third land portion 23 are not communicated with the second main groove 12, the rigidity of the third land portion 23 can be ensured, and the steering stability on dry road surfaces can be improved.

Furthermore, in the aforementioned pneumatic tire, an angle $\theta_A$ with respect to the tire circumferential direction of each of the lateral grooves 41 disposed in the first land portion 21 and an angle $\theta_B$ with respect to the tire circumferential direction of each of the first groove portions 42A of the auxiliary grooves 42 disposed in the second land portion 22, and an angle $\theta_C$ with respect to the tire circumferential direction of each of the lug grooves 43 disposed in the third land portion 23 desirably satisfy a relationship of $(\theta_A+\theta_B)/2-15° \leq \theta_C \leq (\theta_A+\theta_B)/2+15°$. Here, the angle $\theta_A$ of the lateral groove 41 is an angle formed by the centerline of the lateral groove 41 with respect to the tire circumferential direction, and the angle $\theta_B$ of the first groove portion 42A of the auxiliary groove 42 is an angle formed by a straight line, connecting the open end $P_1$ and the bend point $P_2$ of the auxiliary groove 42, with respect to the tire circumferential direction. The angle $\theta_C$ of the lug groove 43 is an angle formed by the centerline of the lug groove 43 with respect to the tire circumferential direction in the ground contact region. The angles $\theta_A$, $\theta_B$, and $\theta_C$ are measured toward the same direction in the tire circumferential direction.

The angle $\theta_A$ of the lateral groove 41, the angle $\theta_B$ of the first groove portion 42A of the auxiliary groove 42, and the angle $\theta_C$ of the lug groove 43 are optimized as just described, and thus the rigidity of the tread portion 1 can be prevented from decreasing. In addition, the snow performance can be improved while the steering stability on dry road surfaces can be appropriately maintained. Here, when the relationship of $\theta_C < (\theta_A+\theta_B)/2-15°$ or $\theta_C > (\theta_A+\theta_B)/2+15°$ is met, the improvement effect of steering stability on dry road surfaces decreases.

EXAMPLES

A pneumatic tire having a tire size of 205/55R16 91V includes: a tread portion extending in a tire circumferential direction and having an annular shape; a pair of sidewall portions disposed on both sides of the tread portion; and a pair of bead portions disposed inward of the sidewall portions in a tire radial direction. In the pneumatic tire, as illustrated in FIG. 2, a pair of first main grooves extending in the tire circumferential direction and a pair of second main grooves extending in the tire circumferential direction are formed in the tread portion. A first land portion is defined between the pair of first main grooves, and second land portions are respectively defined between one of the first main grooves and one of the second main grooves and between the other of the first main grooves and the other of the second main grooves. Third land portions are defined outward of the respective second main grooves. A plurality of first sipes (groove width: 1.0 mm) extending in a tire lateral direction and a plurality of lateral grooves (groove width: 1.5 mm) extending in the tire lateral direction are formed in the first land portion. Each of the first sipes and each of the lateral grooves are disposed at the same angle with respect to the tire circumferential direction, and the first sipe and the lateral groove are connected to each other. The first sipe and the lateral groove are respectively opened to one of the pair of first main grooves. A plurality of second sipes (groove width: 1.0 mm) extending in the tire lateral direction and a plurality of auxiliary grooves each having a bent shape are formed in the second land portion. The second sipes are oriented in the same direction as the first sipes. The auxiliary groove includes a first groove portion extending from an open end to a bend point, and a second groove portion extending from the bend point to a closed end. A plurality of lug grooves extending in the tire lateral direction and a plurality of longitudinal grooves each connecting the lug grooves located side by side in the tire circumferential direction are formed in the third land portion. Such a pneumatic tire according to Examples 1 to 5 was produced.

In Examples 1 to 5, a ratio b/a of the length b of the second groove portion to the length a of the first groove portion of the auxiliary groove, a difference $(|\alpha_2-\alpha_1|)$ between the angle $\alpha_1$ of the first sipe with respect to the tire circumferential direction and the angle $\alpha_2$ of the second sipe with respect to the tire circumferential direction, the intersection angle $\beta_1$ of the first groove portion of the auxiliary groove with respect to the second sipe, a communication state of the lug groove, and an arrangement relationship between the lateral groove and the auxiliary groove were set as indicated in Table 1.

The communication state of the lug groove is indicated as "communicating" when the lug groove is in communication with the second main groove, and is indicated as "not communicating" when the lug groove is not in communication with the second main groove. The arrangement relationship between the lateral groove and the auxiliary groove is indicated as "overlapped" when the second groove portion of the auxiliary groove is overlapped with the imaginary extended portion of the lateral groove, and is indicated as "not overlapped" when the second groove portion of the auxiliary groove is not overlapped with the imaginary extended portion of the lateral groove.

For comparison, a tire of Conventional Example in which only sipes transversely extending on a first land portion are formed in the first land portion, the tire of Comparative Example 1 in which only the lateral grooves transversely extending on the first land portion are formed in the first land portion, the tire of Comparative Example 2 in which the sipes not transversely extending on the first land portion and the lateral grooves not transversely extending on the first land portion are separately formed in the first land portion, and the tires of Comparative Examples 3 to 5 in which the sipes and the lateral grooves respectively connected to each other are formed in the first land portion transversely extending on the first land portion in the same way as in Example 1, were prepared. For the Conventional Example and Comparative Examples 1 to 5, the structure thereof was set in detail as indicated in Table 1.

The steering stability on dry road surfaces and the snow performance of the test tires were evaluated in accordance with the following evaluation methods, and the results are also indicated in Table 1.

Steering Stability on Dry Road Surfaces:

The test tires were mounted on wheels having a rim size of 16×6.5 JJ, inflated to an air pressure of 200 kPa, and mounted on a test vehicle (front wheel drive vehicle) of 1600 cc displacement. Feeling evaluations were performed by a test driver on a test course with a dry road surface. The evaluation results are represented by index values with the Conventional Example being assigned 100. Larger index values indicate superior steering stability on dry road surfaces.

Snow Performance:

The test tires were mounted on wheels having a rim size of 16×6.5 JJ, inflated to an air pressure of 200 kPa, and mounted on a test vehicle (front wheel drive vehicle) of 1600 cc displacement. A braking distance was measured after ABS braking from a state of traveling at a speed of 40 km/h until the vehicle came to a stop on a test course with a road surface of compacted snow. The evaluation results are expressed as index values using the reciprocal of the measurement values, with the Conventional Example being assigned the index value of 100. Larger index values indicate shorter braking distance and superior snow performance.

TABLE 1

|  |  | Conventional Example | Comparative Example 1 | Comparative Example 2 | Comparative Example 3 |
|---|---|---|---|---|---|
| First land portion | Lug groove only | — | Yes | — | — |
|  | Sipe only | Yes | — | — | — |
|  | Lug groove and sipe (not transversely extending) | — | — | Yes | — |
|  | Lug groove and sipe (transversely extending) | — | — | — | Yes |
| Second land portion | Ratio of length of auxiliary groove b/a | 0 | 0 | 0 | 0 |
|  | Difference between sipe angles $\|\alpha_2 - \alpha_1\|$ [°] | 45 | 45 | 45 | 45 |
|  | Cross angle $\beta_1$ [°] | 0 | 0 | 0 | 0 |
| Third land portion | Communication state of lug groove | Communicating | Communicating | Communicating | Communicating |
| Between land portions | Arrangement relationship between lateral groove and auxiliary groove | — | — | — | — |
| Evaluation | Steering stability on dry road surfaces | 100 | 90 | 100 | 100 |
|  | Snow performance | 100 | 100 | 100 | 100 |

|  |  | Comparative Example 4 | Comparative Example 5 | Example 1 | Example 2 |
|---|---|---|---|---|---|
| First land portion | Lug groove only | — | — | — | — |
|  | Sipe only | — | — | — | — |
|  | Lug groove and sipe (not transversely extending) | — | — | — | — |
|  | Lug groove and sipe (transversely extending) | Yes | Yes | Yes | Yes |
| Second land portion | Ratio of length of auxiliary groove b/a | 0.2 | 0.45 | 0.2 | 0.28 |
|  | Difference between sipe angles $\|\alpha_2 - \alpha_1\|$ [°] | 45 | 0 | 0 | 0 |
|  | Cross angle $\beta_1$ [°] | 0 | 80 | 80 | 0 |
| Third land portion | Communication state of lug groove | Communicating | Communicating | Communicating | Communicating |
| Between land portions | Arrangement relationship between lateral groove and auxiliary groove | Overlapped | Overlapped | Overlapped | Overlapped |
| Evaluation | Steering stability on dry road surfaces | 103 | 100 | 110 | 108 |
|  | Snow performance | 103 | 110 | 110 | 112 |

|  |  | Example 3 | Example 4 | Example 5 |
|---|---|---|---|---|
| First land portion | Lug groove only | — | — | — |
|  | Sipe only | — | — | — |
|  | Lug groove and sipe (not transversely extending) | — | — | — |
|  | Lug groove and sipe (transversely extending) | Yes | Yes | Yes |
| Second land portion | Ratio of length of auxiliary groove b/a | 0.2 | 0.2 | 0.2 |
|  | Difference between sipe angles $\|\alpha_2 - \alpha_1\|$ [°] | 0 | 0 | 0 |
|  | Cross angle $\beta_1$ [°] | 45 | 80 | 80 |
| Third land portion | Communication state of lug groove | Communicating | Communicating | Not communicating |
| Between land portions | Arrangement relationship between lateral groove and auxiliary groove | Overlapped | Not overlapped | Not overlapped |
| Evaluation | Steering stability on dry road surfaces | 108 | 115 | 120 |
|  | Snow performance | 110 | 110 | 110 |

As is clear from Table 1, in each of the tires of Examples 1 to 5, the steering stability on dry road surfaces and the snow performance were improved in a well-balanced manner compared with Conventional Example. On the other hand, in the tires of Comparative Examples 1 to 5, the steering stability on dry road surfaces and the snow performance were not sufficiently improved.

The invention claimed is:

1. A pneumatic tire comprising:
   a tread portion extending in a tire circumferential direction and having an annular shape;
   a pair of sidewall portions disposed on both sides of the tread portion; and a pair of bead portions disposed inward of the sidewall portions in a tire radial direction, wherein at least four circumferential grooves including a pair of first main grooves located on both sides of a tire equator and extending in the tire circumferential direction, and a pair of second main grooves located outward of the first main grooves and extending in the tire circumferential direction are formed in the tread portion, a first land portion is defined between the pair of first main grooves, second land portions are respectively defined between one of the first main grooves and one of the second main grooves and between the other of the first main grooves and the other of the second main grooves, a plurality of first sipes each having a groove width equal to or smaller than 1 mm and extending in a tire lateral direction, and a plurality of lateral grooves each having a width greater than 1 mm and extending in the tire lateral direction are formed in the first land portion, the first sipe and the lateral groove are disposed at the same angle with respect to the tire circumferential direction and are connected to each other, and the first sipe and the lateral groove are respectively opened to one of the pair of first main grooves, a plurality of second sipes each extending in the tire lateral direction, and a plurality of auxiliary grooves each having one end opened to the second main groove and the other end closed in the second land portion and each being formed in a bent shape are formed in the second land portion, the second sipe is oriented in the same direction as the first sipe, and the auxiliary groove includes a first groove portion extending from an open end to a bend point and a second groove portion extending from the bend point to a closed end, and an intersection angle of the first groove portion with respect to the second sipe is in a range of 45° to 90°, and a length a of the first groove portion and a length b of the second groove portion satisfy a relationship of $0.05 \times a \leq b \leq 0.4 \times a$; wherein a third land portion is defined outward of a circumferential groove of the circumferential grooves, the circumferential groove is located on the outermost side in the tire lateral direction, and a plurality of lug grooves extending in the tire lateral direction and not being in communication with the circumferential groove, and a plurality of longitudinal grooves connecting the lug grooves, located side by side in the tire circumferential direction, to each other are formed in the third land portion, and an angle $\theta_A$ with respect to the tire circumferential direction of the lateral groove disposed in the first land portion, an angle $\theta_B$ with respect to the tire circumferential direction of the first groove portion of the auxiliary groove disposed in the second land portion, and an angle $\theta_C$ with respect to the tire circumferential direction of the lug groove disposed in the third land portion satisfy a relationship of $(\theta_A+\theta_B)/2-15° \leq \theta_C \leq (\theta_A+\theta_B)/2+15°$.

2. The pneumatic tire according to claim 1, wherein when an imaginary extended portion is assumed to be formed by extending the lateral groove toward the first main groove to which the lateral groove is opened, the second groove portion of the auxiliary groove is disposed not overlapping with the imaginary extended portion of the lateral groove.

\* \* \* \* \*